United States Patent [19]

Harms et al.

[11] Patent Number: 4,561,979

[45] Date of Patent: Dec. 31, 1985

[54] SINGLE CARTRIDGE FILTER

[75] Inventors: John F. Harms, North Palm Beach; John F. Harms, II, West Palm Beach, both of Fla.

[73] Assignee: Harmsco, Inc., North Palm Beach, Fla.

[21] Appl. No.: 645,435

[22] Filed: Aug. 29, 1984

Related U.S. Application Data

[63] Continuation-in-part of Ser. No. 455,107, Jan. 3, 1983, abandoned.

[51] Int. Cl.⁴ .............................................. B01D 27/06
[52] U.S. Cl. .................................... 210/438; 210/450; 210/457; 210/493.2; 210/497.01
[58] Field of Search ............... 210/169, 196, 237, 238, 210/248, 249, 243, 349, 323.1, 416.2, 420, 436, 450, 451, 452, 472, 493.1, 493.2, 493.5, 497.2, 457, 507, 508, 438

[56] References Cited

U.S. PATENT DOCUMENTS

| | | | |
|---|---|---|---|
| 1,023,488 | 4/1912 | Zahm | 422/38 |
| 1,742,919 | 1/1930 | Manning | 210/91 |
| 2,212,647 | 8/1940 | Nugent | 210/131 |
| 2,395,449 | 2/1946 | Briggs | 210/204 |
| 2,642,187 | 6/1953 | Bell | 210/169 |
| 2,709,524 | 5/1955 | Russell et al. | 210/131 |
| 2,714,964 | 8/1955 | Radford | 210/131 |
| 2,728,458 | 12/1955 | Schultz | 210/148 |
| 2,801,006 | 7/1957 | Hultgren et al. | 210/133 |
| 2,833,415 | 5/1958 | Wilkinson | 210/130 |
| 2,833,416 | 5/1958 | Wilkinson | 210/130 |
| 2,846,074 | 8/1958 | Brundage | 210/457 |
| 2,855,103 | 10/1958 | Wilkinson | 210/315 |
| 2,855,104 | 10/1958 | Wilkinson | 210/315 |
| 2,889,933 | 6/1959 | Brundage | 210/541 |
| 2,919,765 | 1/1960 | Kasten | 183/71 |
| 2,934,791 | 5/1960 | Kasten et al. | 18/59 |
| 2,962,121 | 11/1960 | Wilber | 183/71 |
| 3,026,609 | 3/1962 | Bryan | 29/419 |
| 3,054,507 | 9/1962 | Humbert, Jr. et al. | 210/493 |
| 3,095,290 | 6/1963 | Hockett | 55/502 |
| 3,111,488 | 11/1963 | Casaleggi | 210/232 |
| 3,133,847 | 5/1964 | Millington | 156/69 |
| 3,164,506 | 1/1965 | Lake | 156/69 |
| 3,187,896 | 6/1965 | Wilkinson | 210/130 |
| 3,189,179 | 6/1965 | McMichael | 210/238 |
| 3,216,068 | 11/1965 | Williams | 20/69 |
| 3,221,880 | 12/1965 | Wilkinson | 210/130 |
| 3,256,989 | 6/1966 | Hultgren | 210/130 |
| 3,280,981 | 10/1966 | Renfrew | 210/197 |
| 3,291,310 | 12/1966 | Marvel | 210/169 |
| 3,294,241 | 12/1966 | Sicard et al. | 210/232 |

(List continued on next page.)

*Primary Examiner*—Richard V. Fisher
*Assistant Examiner*—Wanda L. Millard
*Attorney, Agent, or Firm*—Hugh Adam Kirk

[57] ABSTRACT

This disclosure concerns a vessel or housing having a removable domed cover and a horizontal partition in the housing to form separate dirty and clean liquid chambers, and having a single large vertical cylindrical pleated filter cartridge clamped against the lower side of the partition in the dirty liquid chamber in the housing. The filter cartridge has a central perforated tube which axially fits over and is spaced from a vertical outlet duct extending up from the bottom of the housing through an aperture in the partition, which aperture forms an annular opening from the interior of the filter cartridge into the clean liquid chamber in the domed cover. The lower end of the filter cartridge seals to a sleeve around the bottom of the vertical outlet duct. The seals for the top and bottom of the cartridge may comprise integral soft plastisol annuli or ring gaskets in the harder plastisol end discs which seal the ends of the pleats of the filter cartridge and the ends of its central perforated tube. The liquid to be filtered enters the housing below the partition around the outside of the filter cartridge and the filtered liquid passes through the perforated central tube of the cartridge around the outside of the vertical outlet duct up into the domed cover and then down through the vertical outlet duct. This construction insures automatic removal of any gases which may accumulate in the domed cover.

17 Claims, 8 Drawing Figures

U.S. PATENT DOCUMENTS

| | | | |
|---|---|---|---|
| 3,394,815 | 7/1968 | Harms et al. | 210/323 |
| 3,407,252 | 10/1968 | Pall et al. | 264/131 |
| 3,536,200 | 10/1970 | Gigliotti | 210/345 |
| 3,720,322 | 3/1973 | Harms | 210/232 |
| 3,724,665 | 4/1973 | Hall | 210/130 |
| 3,733,267 | 5/1973 | Haase | 210/127 |
| 3,986,960 | 10/1976 | Wire et al. | 210/232 |
| 4,057,612 | 11/1977 | Clark et al. | 264/275 |
| 4,186,099 | 1/1980 | Henschel, Jr. et al. | 210/457 |
| 4,187,179 | 2/1980 | Harms | 210/238 |
| 4,201,209 | 5/1980 | LeVeen et al. | 128/218 P |
| 4,208,362 | 6/1980 | Deichert et al. | 264/1 |
| 4,253,954 | 3/1981 | Midkiff et al. | 210/440 |
| 4,349,363 | 9/1982 | Patel et al. | 210/450 |

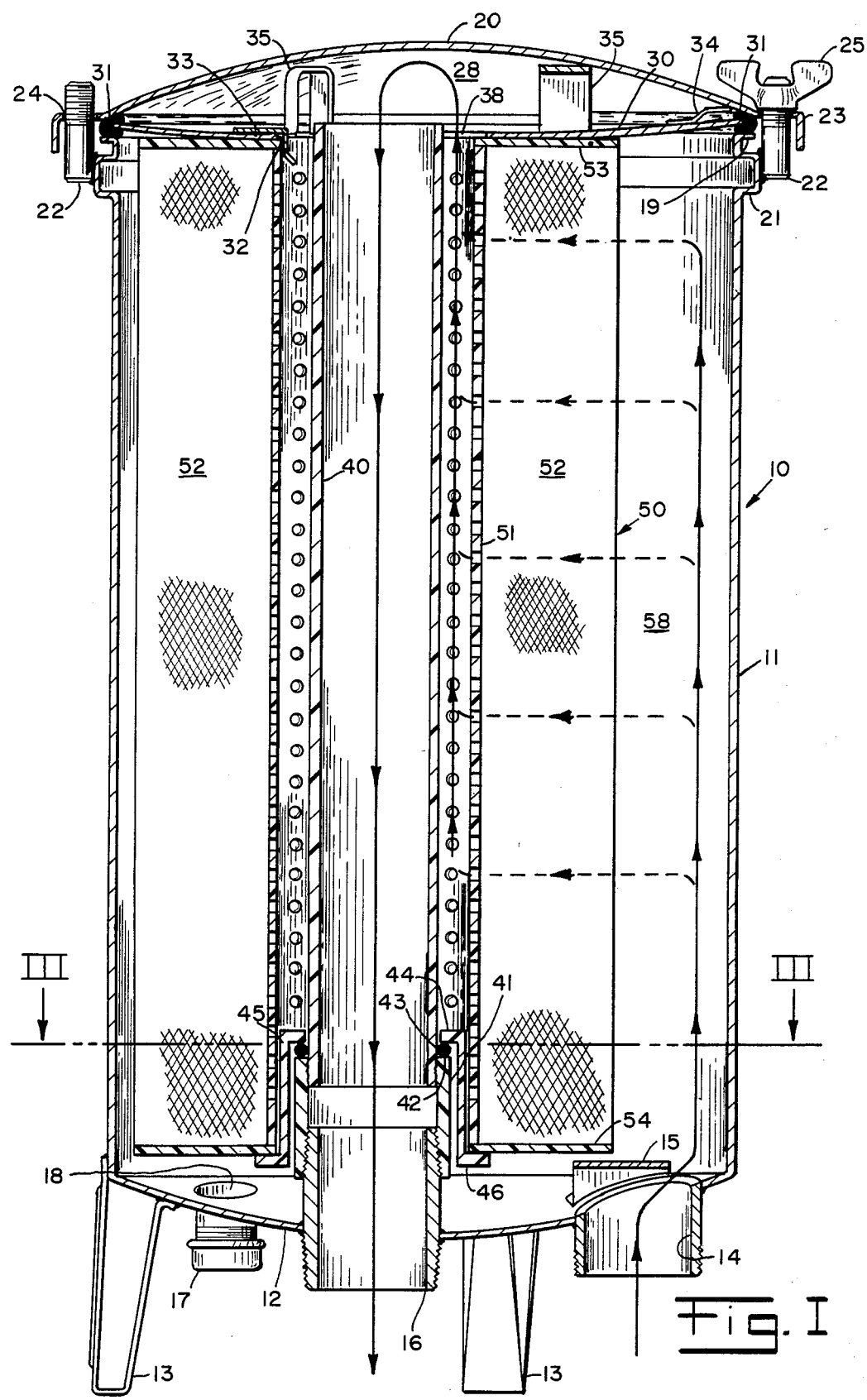

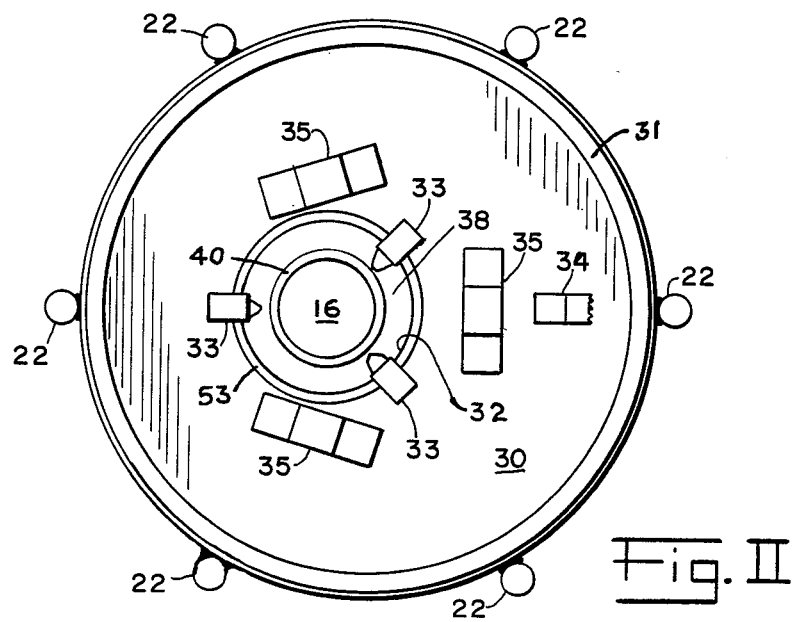
Fig. II
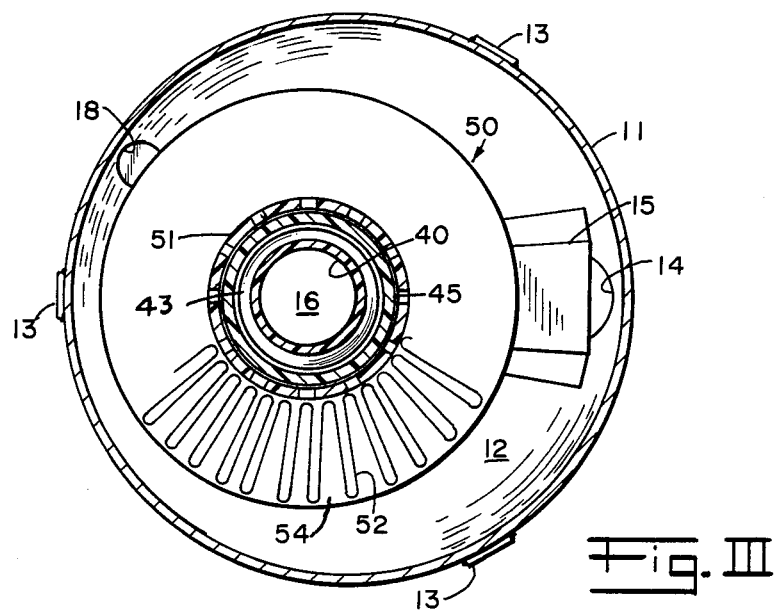
Fig. III

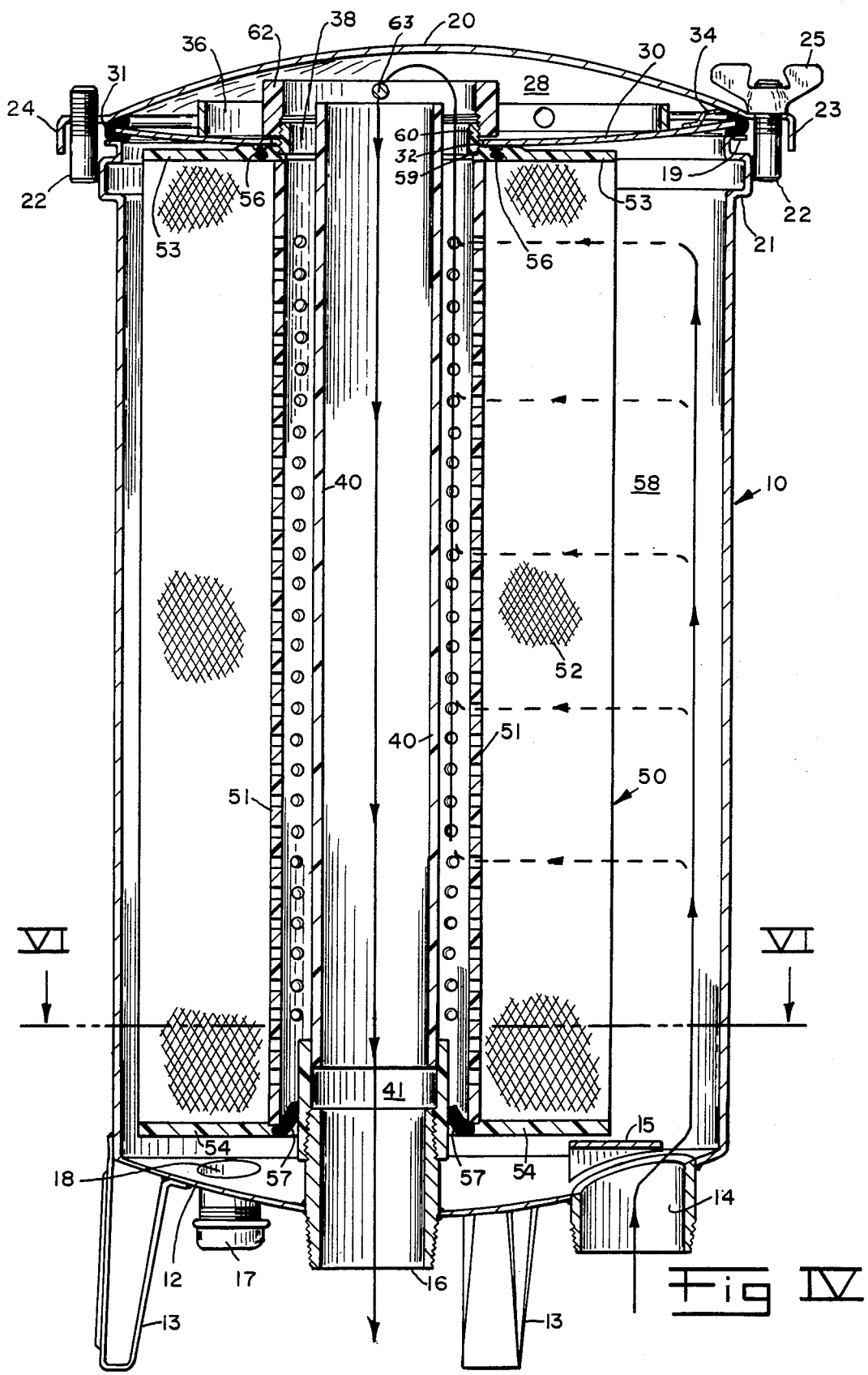

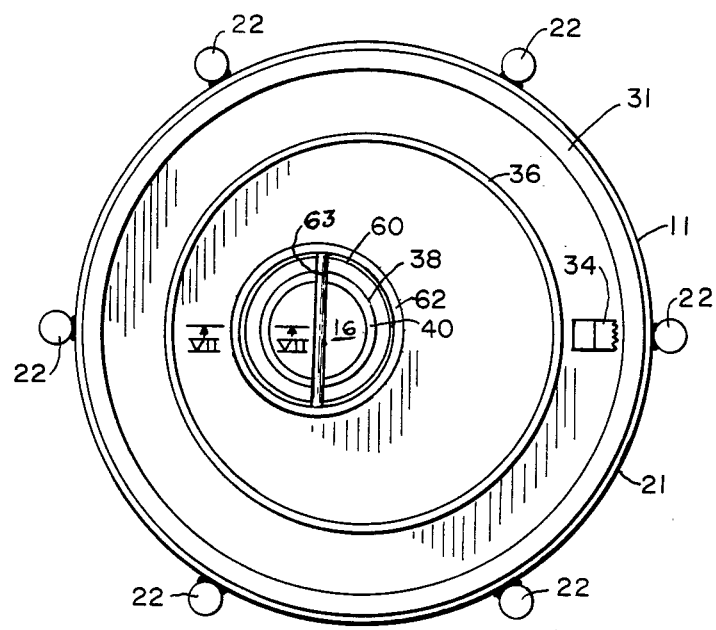
Fig. V
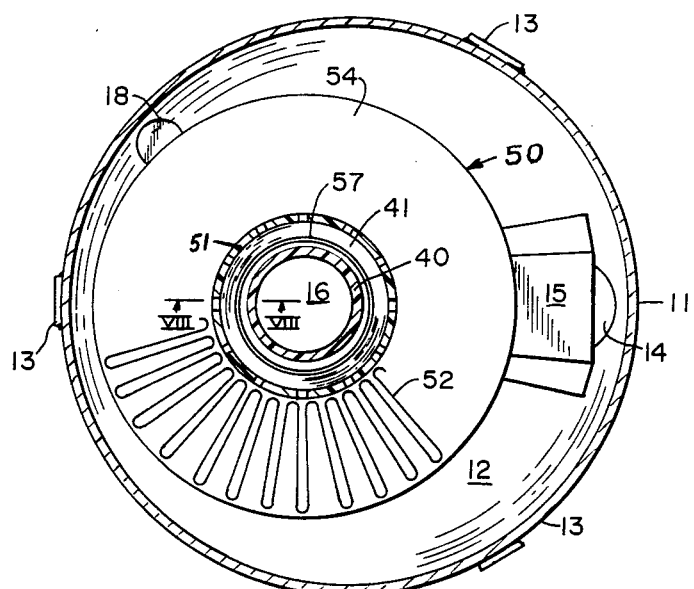
Fig. VI

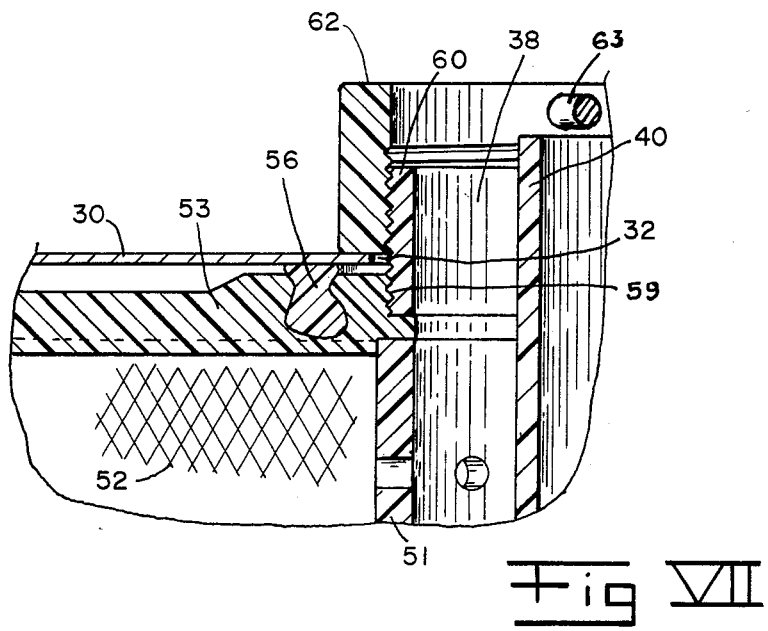
Fig VII
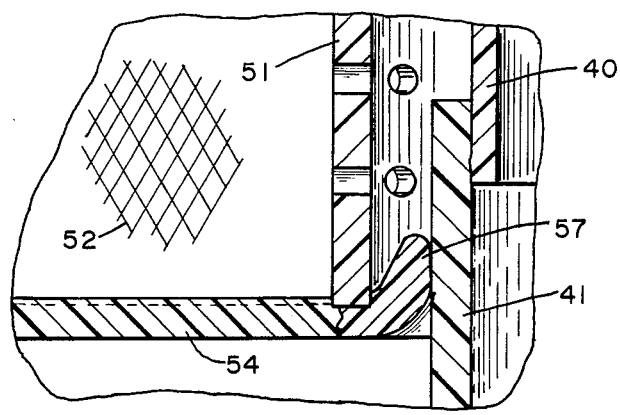
Fig VIII

SINGLE CARTRIDGE FILTER

BACKGROUND OF THE INVENTION

This invention is an improvement over applicant's U.S. Pat. No. 3,720,322 issued Mar. 13, 1973 and applicant's U.S. Pat. No. 4,187,179 issued Feb. 5, 1980, and is a continuation-in-part of application Ser. No. 06/455,107 filed Jan. 3, 1983, now abandoned.

Most of the single cartridge filters in housings known in the prior art do not provide means or structures for preventing the accumulation of gases in their housing chambers, which gases reduce their efficiency. Also, some filters comprise a relatively large plurality, i.e. a dozen or more, of separate clamped-together small filter cartridges which can be time-consuming to change. Furthermore, most single cartridge filters require separate gasket means for sealing them in their filtering positions, instead of having integral sealing gaskets at each end of the filter cartridge as invented herein.

SUMMARY OF THE INVENTION

The single cartridge filter of this invention comprises a vessel with an open top into which the improved single filter cartridge of this invention is easily placed and removed. An easily removable domed cover for the open top of the vessel clamps between its periphery and the rim of the vessel, a flexible partition plate separating the vessel into two chambers, one for dirty liquid below the partition and one for clean or filtered liquid above the partition. The peripheral edge of the partition has a gasket which extends over both sides thereof for sealing the partition plate in the vessel and the cover on the vessel. The inlet and outlet are in the vessel housing, the outlet being directly connected to a vertical tube which extends up through the vessel through an aperture in the partition plate to above the rim of the vessel into the clean liquid chamber. The partition plate is provided with spacer means which engage the inside of the dome of the cover for limiting the flexing of the partition when the cover is clamped onto the vessel. If desired, and preferably, the partition plate is grounded by means of a scratch-contact as disclosed in applicant's above mentioned Harms U.S. Pat. No. 4,187,179.

An important improvement of this invention is in the single filter cartridge which comprises a cylindrical pleated fibrous sheet filter medium, surrounding a perforated tube having a larger inside diameter than the outside diameter of the vertical outlet duct up through the inside of the vessel, over and spaced around which duct the cartridge is placed. Annular plastisol discs close the ends of the pleats at the opposite ends of the filter cartridge and seal with the bottom side of the partition and with the outside of the lower end of the outlet tube. These plastisol discs are press-sealed at one or both ends and may include integral softer plastisol rings to form gaskets that seal around the bottom of the vertical outlet duct near the bottom of the filter vessel and seal with the underside of the flexible partition plate at the top of the filter vessel. The clamping action may be by pressure of the cover against the spacers on the partition, or by a nipple which threads into one end of the cartridge and extends through the aperture in the partition to receive a ring nut thereon to clamp the cartridge to the partition. The aperture in the partition plate for the vertical outlet duct or tube is sufficiently larger in diameter than the outside diameter of the outlet tube and the inside diameter of the threaded nipple, so as to provide an annular opening for the filtered liquid from the perforated center tube of the cartridge to flow freely into the dome-covered clean liquid chamber above the partition.

Thus, dirty liquid to be filtered is introduced into the vessel, preferably at its bottom, and flows around the outside of the single filter cartridge. The filtered liquid passes through the perforations in the central tube of the cartridge, around the outside of the vertical outlet duct up into the domed cover of the vessel, and thence down through said vertical outlet duct. Accordingly, any air or gas that would accumulate in the vessel or its cover will be sucked out automatically through the outlet duct by the liquid flow, and any dirt that would accumulate on the filter cartridge which would fall off, will fall into the dirty liquid, and not come in contact with any of the clean or filtered liquid in the cover of the vessel.

The single filter cartridge of this invention can be used generally for filtering many types of liquids in a closed vessel to which a different pressure than atmospheric pressure is applied, usually an increased pressure. For example, some of the liquids which can be filtered include contaminated water, including water from swimming pools, chemicals, cosmetics, industrial coolants, liquid foods, etc.

OBJECTS AND ADVANTAGES

Accordingly, it is an object of this invention to produce an efficient, effective, simple, economic liquid filter.

Another object is to produce such a filter housing which contains a partition that separates the dirty from the clean liquid.

A further object is to produce such a filter which has an easily and quickly replaceable single filter cartridge provided with integral sealing gaskets.

A still further object is to produce such a liquid filter which automatically removes any gases that may be introduced into the filter vessel.

BRIEF DESCRIPTION OF THE VIEWS

The above mentioned and other features, objects and advantages, and a manner of attaining them are described more specifically below by reference to an embodiment of this invention shown in the accompanying drawings, wherein:

FIG. I is a vertical sectional view of one embodiment of the single cartridge filter of this inventon;

FIG. II is a top plan view on a reduced scale, of the filter vessel shown in FIG. I with its domed cover removed;

FIG. III is a sectional view, on a reduced scale similar to that of FIG. II, taken along line III—III of FIG. I;

FIG. IV is a vertical sectional view similar to FIG. I of another embodiment of the single cartridge filter of this invention;

FIG. V is a top plan view on a reduced scale of the filter vessel shown in FIG. IV with its domed cover removed;

FIG. VI is a sectional view on a reduced scale similar to that of FIG. V taken along line VI—VI of FIG. IV;

FIG. VII is an enlarged radial sectional view taken along line VII—VII of FIG. V of the left side of the upper end of the perforated tube of the single filter cartridge and its nipple shown in FIG. IV, showing the integral softer plastisol gasket in the harder plastisol end disc of the single filter cartridge;

FIG. VIII is an enlarged radial sectional view taken along line VIII—VIII of FIG. VI of the left side of the lower end of the perforated tube of the single filter cartridge shown in FIG. IV showing the integral soft plastisol lip seal gasket in the harder plastisol end disc of the single filter cartridge.

DETAILED DESCRIPTION OF PREFERRED EMBODIMENT

A. The Vessel

Referring to FIGS. I and IV, the single cartridge filter assembly 10 of this invention comprises an open top vertical cylindrical container or vessel 11, whose closed bottom 12 may be supported by at least three equally spaced legs 13 to provide room for easy connection to inlet duct 14 which may be covered by a baffle 15, and outlet duct 16 through the bottom 12 as well as a drain duct 18 provided with a screw cap 17. All of these ducts 14, 16 and 18 are preferably hermetically joined, such as by welding, to the bottom 12 of the metal container or vessel 11, and may have their outer ends threaded for connection to pipes. The legs 13 also may be welded to the bottom 12. The top of the vessel 11 may be provided adjacent the rim 19 with an outwardly extending circumferential rib 21 to which are welded a plurality of equally angularly spaced upwardly extending threaded studs 22.

The open top of the vessel 11 is closed by a domed cover 20 having an outwardly extending peripheral flange 23 with apertures 24 which align with the threaded studs 22, onto which studs are threaded winged nuts 25 for clamping the cover 20 onto the vessel 11.

A vertical imperforate outlet tube 40 is sealingly attached at its lower end by a sleeve 41 to the outlet duct 16 to form an extension of this outlet duct 16 up through the perforated tube 51 centrally of the cartridge filter 50 and through the center of the aperture 32 in the partition 30 and on to above the rim 19 of the vessel 11 into the upper filtered or clean liquid chamber 28 in the domed cover. This surrounding sleeve 41 may be sealed to these ducts 16 and 40 by threads and/or a suitable adhesive.

B. The Partition in the Vessel

Inside the vessel 11 and clamped between the cover 20 and the upper peripheral edge or rim 19 of the vessel 11 is a flexible partition plate 30 around the peripheral edge of which is a gasket 31 having a U-shaped cross-section, or a circular cross-section with a radial slit, for seating and surrounding the outer edge of plate 30 by overlapping opposite sides of its edge. Thus, this gasket 31 seals the edge of the dome of the cover 20 to the upper rim 19 of the vessel 11 as well as the partition 30 to form two separate compartments or chambers 28 and 58 in the domed cover 20 and the vessel 11, respectively, when the winged nuts 25 are all tightened on their studs 22.

The flexible partition plate 30 is provided with an aperture 32 vertically aligned with the outlet duct 16 and through the center of which aperture extends an imperforate vertical outlet tube 40 to form an annular opening 38 for the free flow of filtered liquid into the clean liquid chamber 28. If desired, as shown in FIGS. I and II, this aperture 32 may be surrounded by inwardly radially extending flexible clips 33 for centering the vertical imperforate outlet tube or duct 40 in the aperture 32 to insure the annular passage 38.

This partition plate 30 also may be preferably provided with a scratching resilient grounding contact 34 as disclosed and described in applicant's above mentioned U.S. Pat. No. 4,187,179.

In addition, the partition plate 30 is provided with spacing means between its upper surface and the inner surface of the domed cover 20. In FIGS. I and II, this spacing means is shown to comprise a plurality of equally angularly spaced upwardly extending legs or brackets 35 of inverted U-shaped configuration, which not only limits the upward flexing of the partition plate 30, but also may extend up further than the normal distance of the height of the inside of the dome of the cover 20 so that when the cover 20 is clamped in position, these legs 35 will press and bend the plate 30 downwardly to sealingly contact the upper resilient surface of disc 53 of the single filter cartridge 50, and/or gasket 56 (see FIGS. IV and VII). In the embodiment shown in FIGS. IV and VII, however, in which the cartridge 50 is clamped to the partition 30, this spacer means is shown to comprise a circular fence 36 which may only limit the flexing of the partition 30 toward the cover 20 when liquid introduced into the inlet 14 is under a greater pressure than in the outlet 16. This limiting of the flexibility of the partition 30 prevents pulling of the peripheral gasket 31 out from between the rim 19 and flange 23, insuring continuous sealing of the cover 20 on the vessel 11 and of the partition 30 separating the clean liquid compartment 28 from the dirty liquid compartment 58.

C. The Single Filter Cartridge

The single filter cartridge 50, which substantially fills the dirty liquid chamber 58 inside the vessel or container 11, comprises a central perforated tube 51 of larger inside diameter than the outside diameter of the outlet tubular duct 40, and has a diameter about equal to, and preferably at least that of, the diameter of the aperture 32 in the partition plate 30. Surrounding this perforated tube 51 may be and herein shown a pleated fabric or fibrous sheet medium 52, the open ends of which axially aligned pleats are sealed closed by being embedded in top and bottom resilient plastic annular discs 53 and 54, respectively, together with the ends of the perforated tube 51.

In FIGS. I and III, the sleeve 41 around the lower end of the imperforate outlet tube 40 provides at the upper end 42 of said sleeve 41, a seat for an O-ring 43 which seals against the inner flange 44 of a surrounding bushing 45 having a lower outwardly extending flange 46 that supports and seals against the resilient surface of the disc 54 at the lower end of the filter cartridge 50. Thus, when the partition plate 30 is pressed downwardly by the brackets 35 against the top of the single filter cartridge 50, the cartridge 50 is pushed downwardly also so that the lower end of the central perforated tube 51 inside the filter cartridge 50 is sealed around the outlet duct 40, as well as being supported and spaced above the bottom 12 of the vessel 11.

Referring now specifically to FIGS. IV, VII and VIII, the mold for forming the annular end discs 53 and 54 for a pleated filter cartridge 50 may comprise an additional annular groove adjacent the inner diameter of the disc into which is poured a softer plastisol than that normally employed for forming the discs 53 and 54.

However, the plastisol normally employed for the end discs 53 and 54 is resilient and can act as a seal if pressed firmly against a cooperating surface, such as disc 53 pressed against the underside of partition plate 30 in FIG. I. It has been found to be advantageous if separate parts as the bushing 44, 45, 46 and O-ring 43 shown in the embodiment of FIGS. I and III could be eliminated, and a seal for the other lower end of the single filter cartridge were incorporated in or made integral with the cartridge. This has been done by an integral lip-type seal 57 as shown in FIGS. IV, VI and VIII, which lip seal 57 also can be formed of a softer plastisol in a same or similar mold as that of the harder plastisol for the end disc 54. This softer lip-type seal 57 seals against the outer cylindrical surface of the coupling or sleeve 41 and has an additional advantage in that if different cartridges vary in length, they still will be able to form a liquid seal at their lower end around a sleeve 41. Thus a good seal sometimes was not made when a shorter cartridge was to press against the O-ring 43 as in the embodiment shown in FIGS. I through III. It should be understood, however, that gaskets of softer plastisol material of either or both types 56 and 57 shown in FIGS. VII and VIII may be provided in both the plastic discs 53 and 54 without departing from the scope of this invention.

Another feature of the embodiment disclosed in FIGS. IV through VIII is that the upper end disc 53 of the single filter cartridge has also therein an internally threaded central aperture 59 with an internal inner flange to receive and seat respectively an externally threaded nipple 60. This nipple 60 projects up through the aperture 32 in the partition 30 and at its exposed threaded outer end has a ring nut 62 with a diametric handle rod 63 manually threaded thereon for clamping the single filter cartridge 50 against the underside of the partition plate 30, preferably against the integral gasket 56 as shown in FIG. VII. Thus, if desired, the partition plate 30 and single filter cartridge 50 may be removed as a unit from the vessel 11 using the rod 63 as a lifting handle, and then the plate can easily be removed from the cartridge or vice versa by unscrewing the ring nut 62 and/or the nipple 60 from the internally threaded 59 upper disc 53 of the filter cartridge 50. Also, if desired, the nipple 60 may be attached by an adhesive to either the threads 59 or to the nut 62.

D. Operation

In operation, the liquid to be filtered is introduced, usually by a pump (not shown), into the inlet duct 14 and distributed by baffle 15 around the chamber 58 outside of the single filter cartridge 50 in the vessel 11 as shown by the arrows in FIGS. I and IV. The dirty liquid passes to the filter medium of the pleats 52 and clean liquid passes from the pleats and through the holes in the apertured central tube 51 up the annular duct and through the annular opening 38 in the partition 30 into the clean liquid cylindrical chamber 28 under the domed cover 20, and then down through the outlet tube 40 and outlet duct 16. Thus, if any gases or air gets into the filter assembly 10, it will tend to accumulate in the chamber 28 under the domed cover 20 where it is automatically removed through the outlet duct tube 40 that extends into this domed chamber 28.

If the single filter cartridge 50 needs to be cleaned or replaced, such can easily be done by removing the wing nuts 25, taking off the cover 20, lifting off the flexible partition 30 by brackets 35 or handle 63 and the single filter cartridge 50 from the outlet duct tube 40. When the cartridge 50 is cleaned or another or new filter cartridge 50 is to be inserted, it may be first clamped to the partition 30 by nipple 60 and nut 62, or it may be first placed over the outlet duct tube 40, and then the partition plate 30 placed on the rim 19 of the vessel and around the upper end of the outlet duct 40. Next the filter cartridge 50 is clamped into place by the ring nut 62 according to the embodiment shown in FIGS. IV through VIII, or by the wing nuts 25 on the cover 20 after the cover is put in place, according to the embodiment shown in FIGS. I through III.

Thus the changing of the filter cartridge 50 is singular and easy and also has the additional unexpected advantage of having a greater surface area than can be obtained by a plurality of smaller cartridges in an array suspended from a partition plate as disclosed in applicant's above mentioned two prior patents.

Although preferably the vessel 11, cover 20, and ducts 14, 16 and 18 are made of metal, preferably stainless steel to avoid corrosion, and the internal outlet tubular duct 40, bushings 41 and 46, filter cartridge central tube 51 and end discs 53 and 54 are made of plastic, it is to be clearly understood that these and other parts may be made of other and/or just the opposite materials whithout departing from the scope of this invention. Also the plastic discs 53 and 54 and their integral gaskets 56 and 57 may be made of different hardness polyvinyl chloride plastic composition and cured together in their molds. Furthermore, other means besides the wing nuts 25 and studs 22 may be provided for clamping the cover 20 onto the vessel 11, provided the necessary sealing of the partition 30, cover 20 and the upper rim 21 and the opposite ends of filter cartridge 50 are attained.

E. Plastisol Examples

For example, the harder plastisol forming the discs 53 and 54 of the cartridge preferably range from a minimum durometer hardness of about 90A (equivalent to about 30D) to a maximum durometer hardness of about 80D, according to the ASTM Designation D2240-81 for standard test methods for materials having rubber properties. Thus, the optimum shore durometer hardness for such discs is about 50D plus or minus 5D.

On the other hand, the softer plastisol for forming the gasket seals which are integrally embedded and formed together with the harder plastisol discs, namely the seals 56 and 57 as shown in FIGS. IV, VI, VII and VIII, preferably range from a minimum durometer hardness of about 30A to a maximum durometer hardness of about 85A, according to the ASTM Designation D2240-81 for standard test methods for materials having rubber properties. The optimum durometer hardness for these gasket seals is about 70A plus or minus 5A.

The ASTM Designation D2240 Durometer Test A for the softer plastic comprises a pressor foot having a hole with a diameter between 2.5 and 3.2 millimeters and centered in that hole an indentor comprising a hardened steel rod of a diameter between 1.15 and 1.4 millimeters with a 35° angle truncated cone tip whose truncated end diameter is 0.79 millimeters. A similar cone of a 30° angle with a rounded tip of 0.1 millimeter radius is used for Durometer Test D for the harder plastic. These rods with coned tips extend about 2.5 millimeters below the pressor foot through the hole in the foot and these rods are pressed into the plastic by pre-calibrated standard springs equivalent to either a five kilogram weight on the rod in Test D with the more pointed cone tip for the harder plastic, or one kilogram weight on the rod in Test A with the truncated cone tip for the softer plastic. The times at which the measurements are read are also important in that when testing the softer plastics the longer the rod presses therein the deeper it will go and the lower will be the reading. Thus, most readings are taken between one and fifteen seconds after the pressor foot and rod are placed flush with the flat upper surface of the plastic being tested. In the above tests, the durometer readings were taken at one second after the shoe was placed flush with the flat surface of the plastic material. It is also important that the testing rod be placed at least six millimeters from the nearest edge of the plastic sheet or surface for which a durometer hardness reading is to be made.

As previously stated, the plastic may be composed primarily of a polyvinyl chloride which for the harder plastisol for the discs 53 and 54 may contain also for each 100 parts by weight of polyvinyl chloride, 20 to 30 parts by weight of an ester-type plasticizer, 20 to 30 parts by weight of an acrylate monomer, and 2 to 6 parts by weight each of a peroxide catalyst, organo-metallic stabilizers, and pigments. On the other hand, the softer plastisol material for the gasket seals 56 and 57 may contain also for each 100 parts by weight of polyvinyl chloride, 40 to 80 parts by weight of an ester-type plasticizer, and 2 to 6 parts by weight each of organo-metallic stabilizers, and pigments. The ranges of the above ingredients determine the hardness of the finally cured product within the hardness ranges above specified.

Other plastic materials such as polyurethane, polypropylene, epoxy, etc. may be employed instead of polyvinyl chloride; however, these other materials usually have different curing times, temperatures and/or amounts of catalyst to produce the harder and softer plastisols as specified above.

The combined harder and softer plastisol combination discs and gaskets may be formed in a mold in which the intermediate gasket seal 56 and the inner edge gasket seal 57 are first poured as viscous liquids into grooves in the mold for the softer plastisol and then the harder plastisol as a viscous liquid is poured in to fill the rest of the mold. Next one end of the pleats 52 and perforated tube 51 of the cartridge are embedded into this soft plastic in the mold. The mold for the upper disc 53 may have its central internal threads formed in the mold or they may be cut into the disc after the disc 53 has been cured. These plastisols are then cured, such as by heat in an oven, for a predetermined time to produce the hardnesses above mentioned. Then the cartridge is turned upside-down and placed in a second similar mold which is filled with the two plastisols to form the disc 54 at the other end of the cartridge and then cured to complete the cartridge 50 of this invention.

While there is described above the principles of this invention in connection with specific apparatus, it is to be clearly understood that this description is made only by way of example and not as a limitation to the scope of this invention.

We claim:
1. In a filter comprising:
(A) a vertical cylindrical openable top vessel with a bottom wall, said vessel having:
  (a) an inlet and an outlet in its bottom wall,
  (b) a fastening means around its openable top,
  (c) an internal vertical imperforate tube extending from said outlet to above the top edge of said vessel, and
  (d) a sealing surface near the lower end of said vertical tube;
(B) a domed cover for said vessel having:
  (a) means cooperating with said fastening means to attach said cover to said vessel; and
(C) a partition clampable between said top edge of said vessel and the edge of said cover, said partition having:
  (a) a peripheral resilient seal for sealing said partition, said cover, and said vessel together,
  (b) spacer means above said partition and engageable against the inside of said cover;
and the improvement comprising:
  (c) means defining an aperture in said partition through which said vertical tube extends into said domed cover and which aperture is spaced from said vertical tube to form an annular opening in said partition, and
(D) a single replaceable pleated filter cartridge having:
  (a) an internal perforate tube removable axially from around said vertical tube and spaced therefrom to form an annular cylindrical channel between said tubes the full length of said cartridge and aligned with said annular opening in said partition to force filtered liquid through said annular opening into said domed cover, and
  (b) imperforate annular plastic end discs, the lower one of which annular plastic discs sealingly engages said sealing surface near the lower end of said vertical tube and the other of which annular plastic discs sealingly engages the underside of said partition,
whereby a fluid to be filtered is introduced into said inlet connection at the bottom of said vessel and around said filter cartridge, and filtered fluid passes through said internal perforated tube to around said internal imperforate vertical tube into said annular cylindrical channel, and up the outside of said imperforate tube into the domed cover above said partition and then down through the said internal imperforate vertical tube through said outlet at the bottom of said vessel.

2. A filter according to claim 1 wherein at least one of said filter cartridge annular end discs includes an integral resilient plastic gasket softer than the resilient plastic material of that disc.

3. A filter according to claim 2 wherein said softer resilient plastic gasket is in direct sealing engagement with said lower end of said vertical tube.

4. A filter according to claim 2 wherein said softer resilient plastic gasket is in direct sealing engagement with the underside of said partition.

5. A filter according to claim 1 wherein said partition is flexible.

6. A filter according to claim 5 wherein said partition has integrally mounted thereon said spacer means between its upper surface and the inner surface of said cover for limiting the flexibility of said partition toward said cover.

7. A filter according to claim 1 wherein said vessel and cover are made of stainless steel.

8. A filter according to claim 1 wherein said fastening means around the openable top comprises studs and wing nuts.

9. A filter according to claim 1 wherein said internal vertical imperforate tube comprises a rigid plastic material.

10. A filter according to claim 1 wherein said filter cartridge annular end discs comprise a resilient plastic material.

11. A filter according to claim 1 including a grounding contact between said partition and said vessel and domed cover.

12. A filter according to claim 1 wherein one of said plastic end discs of said filter cartridge is centrally internally threaded, and said filter cartridge includes a nipple threaded in said centrally threaded disc, and a ring nut threaded on said nipple to clamp said partition against the adjacent said annular end disc of said filter cartridge.

13. In a filter cartridge comprising:
 (a) an internal perforate tube,
 (b) a pleated sheet filter medium surrounding said tube,
 (c) annular resilient plastic discs embedding the ends of said filter medium and tube, said annular resilient plastic discs have a durometer hardness of between about 30D and about 80D according to ASTM Test Designation D2240-81, and the improvement comprising:
 (d) a more resilient plastic ring gasket integral and exposed outwardly from at least one of said annular plastic end discs, said more resilient plastic ring gaskets have a shore durometer hardness between about 30A and about 85A according to ASTM Test Designation D2240-81.

14. A filter cartridge according to claim 13 wherein said ring gasket projects inwardly from an opening defined in the annular end disc.

15. A filter cartridge according to claim 14 wherein said ring gasket in said opening has a ring lip configuration for engaging a cylindrical surface.

16. A filter cartridge according to claim 13 wherein said ring gasket projects axially from the end surface of said end disc.

17. A filter cartridge according to claim 13 wherein said discs and said gasket are formed of different hardness plastisols in the same mold and are cured together.

* * * * *